United States Patent Office 2,796,003
Patented June 18, 1957

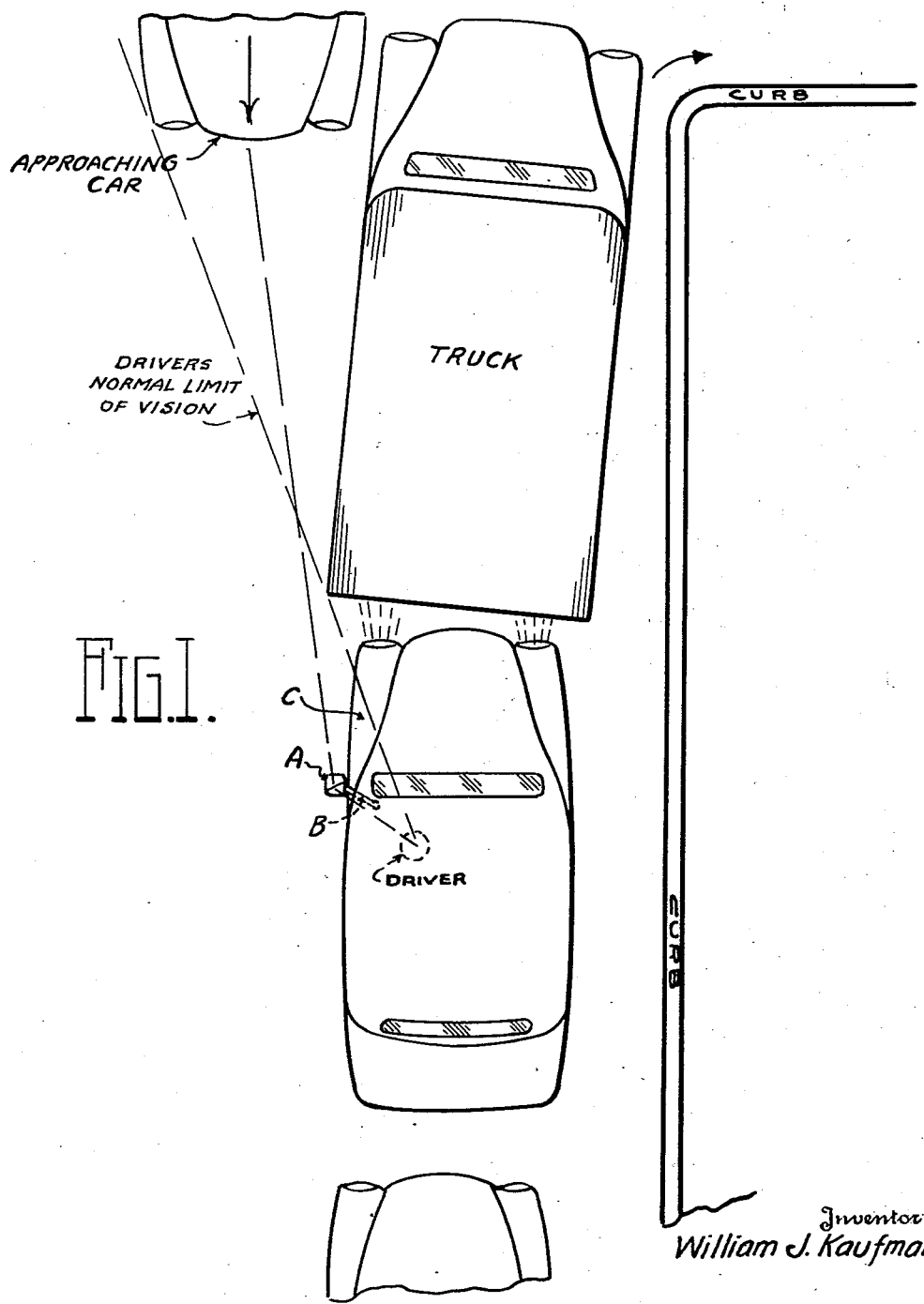

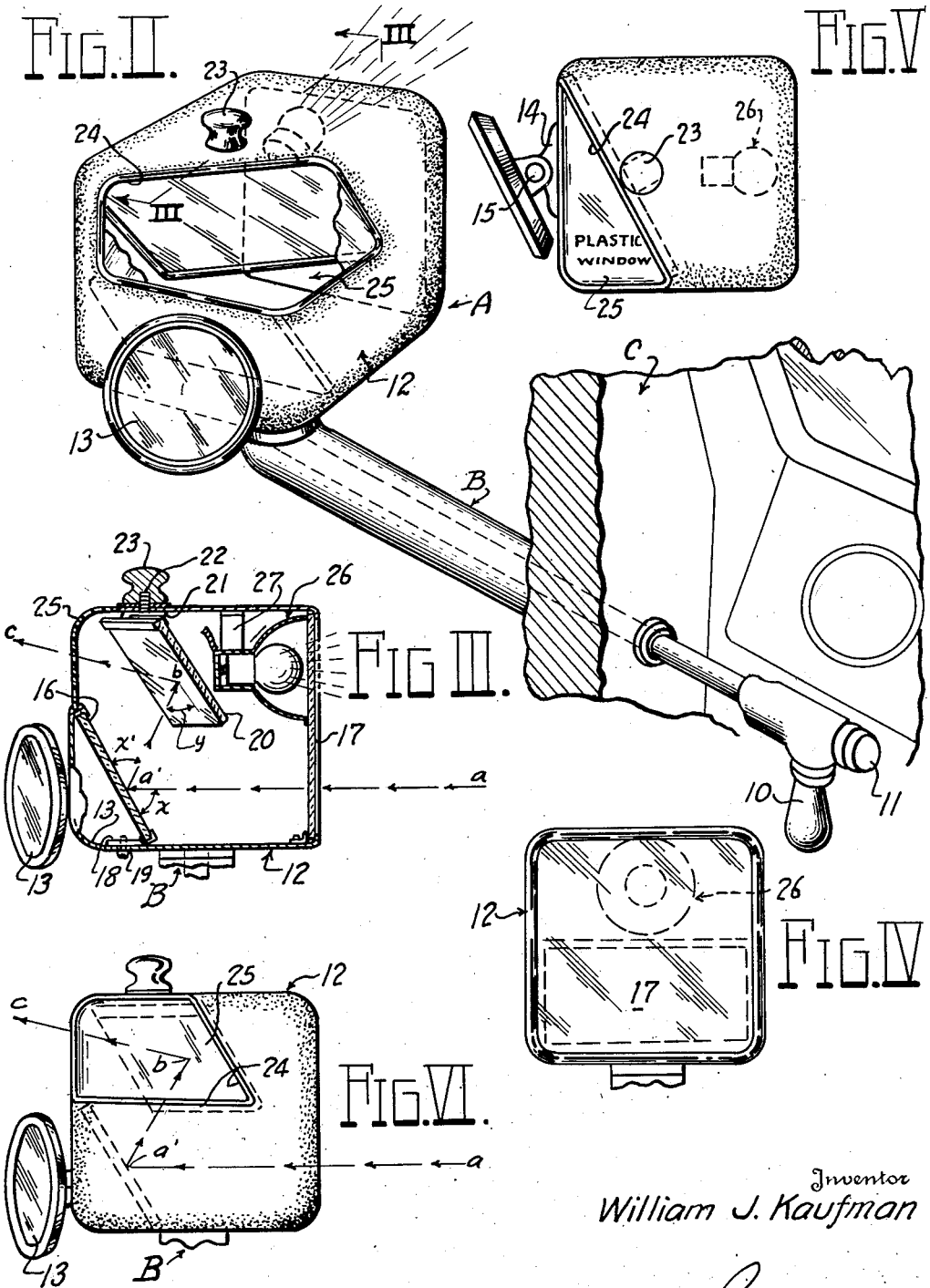

2,796,003

PERISCOPIC DEVICE FOR AUTOMOBILES

William J. Kaufman, Monroe, Mich.

Application April 8, 1953, Serial No. 347,549

1 Claim. (Cl. 88—70)

This invention relates to a combined periscope, rearview mirror and spotlight for an automobile, the periscope arranged so that a driver may readily see a long line of traffic directly ahead of his own car for a considerable distance, as, for example, those approaching in his own line as well as oncoming cars around a righthand curve or abrupt street corner.

The objects of the invention are to make a unit of this type individually adjustable to meet the driver's requirements, the complete unit being also mounted for universal movement, and located off the side of the car with the main adjusting controls extending inside the same.

An important feature of my invention is the arrangement of complementary mirrors in the unit, one adjustable with respect to the other, and set in correct position to bring the proper view as indicated, directly in the driver's line of vision without requiring the driver to move over in his seat or to bend over to the left to get a correct view of traffic conditions ahead.

Further objects and advantages are within the scope of the invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure I is a diagrammatic plan view showing automobiles in a traffic situation, with the combined periscope rear view mirror and spotlight unit attached to one of the cars;

Figure II is a perspective view showing the unit mounted on a car;

Figure III is a section taken substantially along the line III—III of Figure II;

Figure IV is a front view of the unit;

Figure V is a top view of the unit; and

Figure VI is a side elevation of the unit.

Referring to Figures I and II of the drawings, the combination periscope, rear view mirror and spotlight, designated generally as "A" is shown mounted on the conventional type of spotlight carrying arm or rod designated generally as "B."

Arms or supporting rods of this type, capable of causing vertical and horizontal movements of the spotlight are well known in the art and further description is therefore deemed unnecessary. For purposes of illustration, however, the operator's handle adapted to cause vertical movement of the part attached to the arm is designated 10, and the knob adapted to cause horizontal movement is indicated as 11.

The arm B is shown mounted rigidly adjacent the instrument panel 12 of a car "C," and extending outwardly from the left side of said car.

The combination periscope, rear view mirror and spotlight "A" has an outer metallic casing designated generally at 12 which is substantially cubical in formation and which is mounted on the arm "B" in a manner adapted to permit universal oscillation as desired by the operator, the vertical oscillation being caused by the rotation of the entire arm "B" under the influence of handle 10. This horizontal oscillation may be adjusted by the operator through knob 11 and thus by means of handle 10 and knob 11, a complete universal movement of the attached casing 12 is provided. A rear view mirror 13 is attached to casing 12 by a bracket 14 and a screw 15, the latter providing a means for adjusting the rear view mirror 13 with respect to the casing 12.

Within the casing 12 a mirror 16 is mounted at an angle substantially sixty degrees from the horizontal, said mirror having its reflecting surface directed forwardly and being adapted to receive light through a plain glass window 17 mounted in the front face of the device. The mirror 16 is rigidly connected to the casing 12 by bracket 18 and screw 19. The mounting of said mirror is such as to make it parallel in a horizontal plane through its base with the window 17.

A second mirror 20 complementary to mirror 16 is located inside the casing 12 also at a substantial angle to the vertical and in a position with its reflecting surface facing rearwardly above and in front of the mirror 16. However, the second mirror 20 is adjustably rotatable in a horizontal plane so as to be properly "set" in a position to direct the image reflected from the first mirror 16 toward the driver of the car. It will be seen by inspection of Figure III that the angle of the ray $b$—$c$ will be dihedral with respect to vertical and horizontal planes passed through the point "$b$" in mirror 20.

Means for adjusting the mirror 20 to the best position for the car operator is provided by a mounting bracket 21, screw 22 and adjusting knob 23 whereby the mirror may be locked in proper adjusted position. The casing 12 has part of the back and side cut away as at 24 to provide a viewing opening for the mirror 20, this opening being closed by a transparent plastic window 25 which is curved to conform with the contour of the casing 12. Immediately in the rear of the plain glass front window 17 a standard form of spotlight designated generally at 26 is rigidly mounted in the casing 12 by the bracket 27. It will be noted that the lower edge of mirror 20 overlaps the upper edge of mirror 16, increasing the vertical range of the device.

In operation, it will be seen that an image from various points in front of the car and invisible to the driver will enter the casing through window 17 as indicated by the dotted ray $a$, (see Figure III) and will strike the first mirror 16 at $a'$ and be deflected upwardly at an angle $X'$ with the mirror surface, this angle being equal to the angle $X$ of incidence. The ray will then strike the complementary second mirror 20 at an incidence angle of "$y$" somewhat greater than incidence angle $X$, depending upon the setting of the mirror 20. This incoming ray, say generally longitudinally of the car C, will be re-reflected by the surface of mirror 20, but, as the mirror 20 has also been rotated on a vertical axis, the reflected ray will not be parallel to the incoming ray "$a$," but will be directed laterally toward the car C and pass out of the lateral window 25 in the casing in the direction of the operator of the automobile.

By means of the knob 23, the operator can adjust the position of the mirror 20 so as to make the reflected image as large in area as possible in order to take full advantage of the width of the mirror. The operator thus receives a view of the traffic in his own line ahead of his car as well as approaching traffic and also a view of traffic from the rear, all in one compact and readily adjusted unit, the spotlight feature being especially useful to illuminate the oncoming traffic and make it visible in conditions of darkness or fog.

It is apparent that, within the scope of the invention, modifications and different arrangements may be made other than is herein disclosed, and the present disclosure is illustrative merely, the invention comprehending all variations thereof.

What I claim is:

In a combined front view and rear view traffic indicating device for a motor vehicle, the combination of a casing adapted to be adjustably mounted on an automobile; a rearwardly faced mirror carried by said casing and positioned at an angle to project the rear view into the driver's eyes and a pair of angularly positioned cooperating overlapping mirrors within said casing adapted to project the front view into the same driver's eyes, said front view mirrors located at predetermined vertical angles to each other, one above the other with the upper mirror also positioned at a horizontal angle to the front line of view to project the longitudinal rays of light transversely into the driver's eyes, said casing having a transparent front view receiving portion and a side transparent view projecting portion whereby said mirrors are protected from the elements and the driver may see both the rear view and the front view from one position.

References Cited in the file of this patent

UNITED STATES PATENTS

| | | |
|---|---|---|
| 1,666,236 | Fuerth | Apr. 17, 1928 |
| 1,828,924 | Chardell | Oct. 27, 1931 |
| 2,325,253 | Laging | July 27, 1943 |
| 2,534,135 | Lahr | Dec. 12, 1950 |
| 2,540,257 | Gross | Feb. 6, 1951 |
| 2,551,243 | Campbell | May 1, 1951 |
| 2,654,286 | Cesar | Oct. 6, 1953 |